United States Patent
Saiki

(10) Patent No.: US 7,058,507 B2
(45) Date of Patent: Jun. 6, 2006

(54) NAVIGATION SYSTEM

(75) Inventor: Masahiro Saiki, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 10/493,766

(22) PCT Filed: Oct. 15, 2002

(86) PCT No.: PCT/JP02/10646

§ 371 (c)(1),
(2), (4) Date: Apr. 26, 2004

(87) PCT Pub. No.: WO03/038376

PCT Pub. Date: May 8, 2003

(65) Prior Publication Data

US 2004/0254721 A1    Dec. 16, 2004

(30) Foreign Application Priority Data

Oct. 29, 2001  (JP)  .............................. 2001-330467

(51) Int. Cl.
*G01C 21/20*   (2006.01)

(52) U.S. Cl. ...................... 701/207; 701/209; 340/988; 340/995.19; 342/357.13

(58) Field of Classification Search ................ 701/207, 701/209; 340/995.19; 342/357.13; 709/211
See application file for complete search history.

(56) References Cited

U.S. PATENT DOCUMENTS

| | | | |
|---|---|---|---|
| 6,424,910 B1* | 7/2002 | Ohler et al. | 701/202 |
| 6,658,348 B1* | 12/2003 | Rudd et al. | 701/207 |
| 2001/0025222 A1* | 9/2001 | Bechtolsheim et al. | 701/209 |
| 2003/0004776 A1* | 1/2003 | Perrella et al. | 705/9 |
| 2003/0149527 A1* | 8/2003 | Sikila | 701/213 |
| 2003/0191584 A1* | 10/2003 | Robinson et al. | 701/209 |
| 2003/0217073 A1* | 11/2003 | Walther et al. | 707/104.1 |

FOREIGN PATENT DOCUMENTS

| | | |
|---|---|---|
| JP | 10-281782 | 10/1998 |
| JP | 2000-88591 | 3/2000 |
| JP | 2001-148095 | 5/2001 |

OTHER PUBLICATIONS

International Search Report corresponding to application No. PCT/JP02/10646 dated Jan. 21, 2003.

* cited by examiner

Primary Examiner—Thomas G. Black
Assistant Examiner—Christine M. Behncke
(74) Attorney, Agent, or Firm—RatnerPrestia

(57) ABSTRACT

A navigation system, which can determine a place suitable for meeting as a meeting place, is disclosed. This navigation system obtains positional information of mobile units, and extracts candidates for a meeting place from adequate meeting places registered in advance. The navigation system automatically selects or a user manually selects one place from the extracted candidates, and determines the selected one as the meeting place. The navigation system transmits the information about the meeting place to the other mobile units, so that the mobile units can meet each other at the right meeting place free from any place-caused inconvenience.

3 Claims, 6 Drawing Sheets

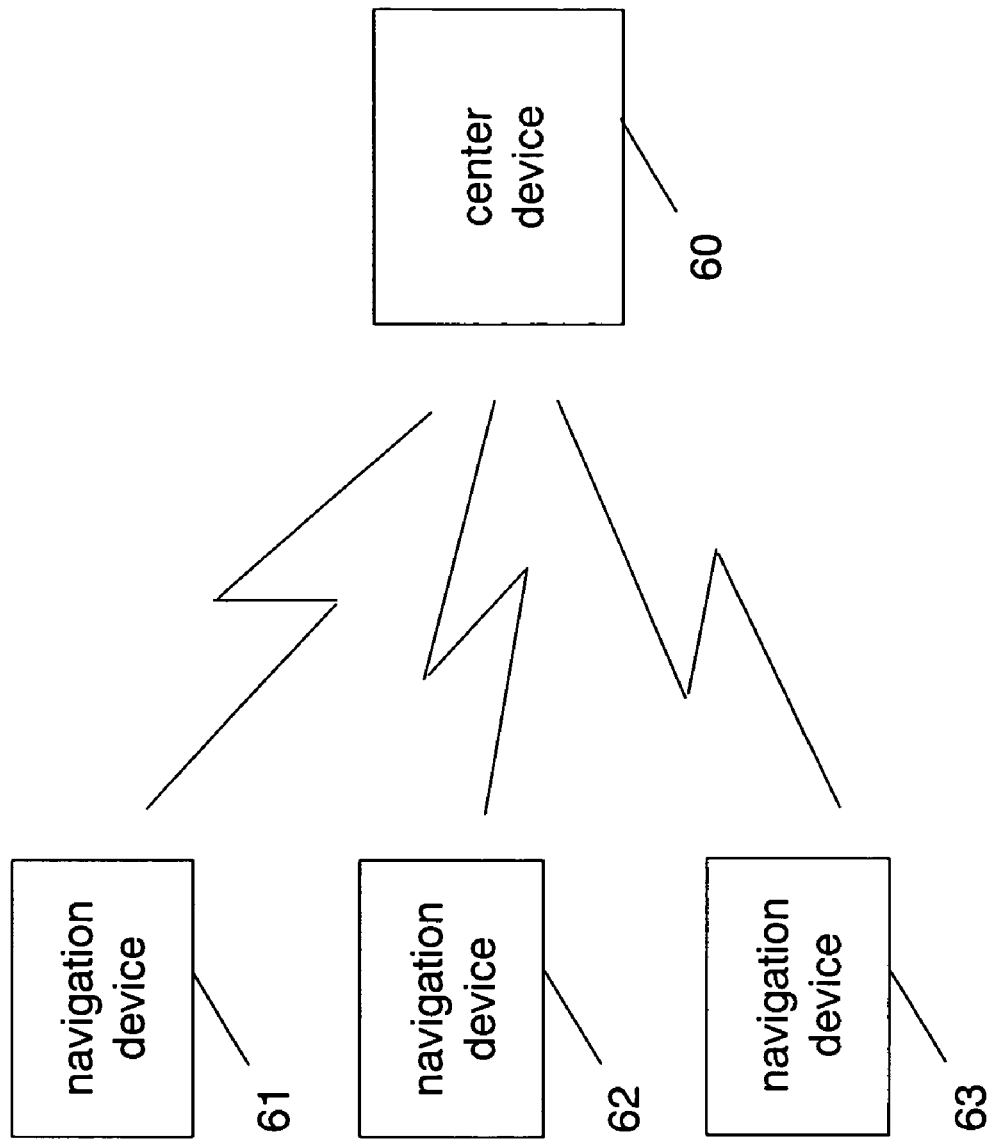

NAVIGATION SYSTEM

This application is a U.S. National Phase Application of PCT Interntional Application PCT/JP02/10646.

TECHNICAL FIELD

The present invention relates to a navigation system which can set a meeting place for a plurality of mobile units to meet each other with ease.

BACKGROUND ART

A navigation system, which sets a meeting place automatically and quickly, has been available for users who drive their cars to meet each other by communicating with each other using in-car navigation devices installed.

An instance of the foregoing navigation system is disclosed in Japanese Patent Application Non-Examined Publication No. 2000-88591. This system sets automatically a meeting place for the cars to meet each other in the fastest way taking into account the information such as a cruising speed of each car and traffic jam on the road.

In the foregoing conventional structure, the respective navigation devices, installed in the cars that want to meet each other, measure their own locations, and transmits those data to the master navigation device. The master navigation device then extracts a meeting place, where the cars can meet in the fastest way, taking into account the information such as cruising speeds of the respective cars and traffic jam based on the location of the car having the master navigation device and the locations of the other cars. The master navigation device then transmits the meeting place extracted to all the navigation devices installed in the other cars.

A conventional navigation system has a structure discussed above, so that the cars want to meet each other travel respectively to the meeting place transmitted from the master navigation device, and they can meet each other in a fast manner.

However, the conventional navigation system simply extracts a meeting place to be reached fastest based on the locations of the cars that want to meet each other, so that the meeting place extracted is not always suitable for the cars to meet. For instance, extracting a road having heavy traffic and difficult to park, a place with no parking lot, or a street jammed with cars as a meeting place is not always fit for cars to meet.

DISCLOSURE OF THE INVENTION

The present invention provides a navigation system that can set a meeting place suitable for cars to meet each other. The navigation system of the present invention comprises the following elements:

positional information obtaining means for obtaining positional information of mobile units;

extracting means for extracting candidates for a meeting place based on the obtained positional information from adequate meeting places registered in advance;

meeting place determining means for selecting one place as the meeting place from the extracted candidates for the meeting place; and transmitting means for transmitting the selected meeting place to the mobile units.

This structure allows selecting a meeting place from appropriate candidates registered in advance for a meeting place, so that the meeting place cannot be an inconvenient location.

Another navigation system of the present invention comprises the following elements:

positional information obtaining means for obtaining positional information of its own mobile unit and other mobile units;

extracting means for extracting candidates for a meeting place based on the obtained positional information from adequate meeting places registered in advance;

meeting place determining means for selecting one place as the meeting place from the extracted candidates for the meeting place; and transmitting means for transmitting the selected meeting place to the other mobile units.

This structure allows extracting plural meeting-place candidates suitable for its own mobile unit and the other mobile units to meet, then selecting one place from the candidates, so that no inconvenient place for the meeting place is selected. As a result, its own mobile unit and the other mobile units can meet each other at an appropriate place.

The transmitting means of the present invention provides at least one of map information to the meeting place, route guidance to the meeting place, an expected arrival time, and expected meeting time. This structure allows the related mobile units to arrive exactly at the selected meeting place based on at least one of those information such as map information to the meeting place, route guidance to the meeting place, an expected arrival time, and expected meeting time.

The present invention extracts meeting-place candidates from adequate meeting places which includes at least one of a station, bus stop, supermarket, convenience store, park, public office, school, shopping mall, cinema complex, parking lot, open space, and intersection. This structure avoids determining an inconvenient place as a meeting place as the conventional system did, and determines a suitable place for cars to meet each other.

The navigation system of the present invention allows providing adequate meeting places with priorities respectively, and the meeting place determining means selects one place according to the priorities. This structure allows determining a more suitable place for cars to meet each other.

The navigation system of the present invention determines the priorities taking into account the information including at least availability of a parking lot, an expected arrival time at the meeting-place candidates. This structure allows determining a priority depending on a combination of the mobile units to be met each other, e.g. a person and a person, a car and a car, or a person and a car. To be more specific, the system determines the priorities depending on the foregoing combination taking into account the information such as the availability of a parking lot, and which party arrives earlier. As a result, the system can select a meeting place without involving a person or a car into trouble.

The navigation system of the present invention further comprises the following elements:

display means for displaying the meeting-place candidates together with the priorities; and operating means for manually selecting a meeting place.

This structure allows a user to select a preferable place by visual confirmation instead of mechanical confirmation.

BRIEF DESCRIPTIONS OF THE DRAWINGS

FIG. 6 shows a schematic block diagram illustrating a navigation system of another exemplary embodiment of the present invention.

BEST MODE FOR PRACTICING THE INVENTION

Exemplary embodiments of the present invention are demonstrated hereinafter with reference to the accompanying drawings.

EXEMPLARY EMBODIMENT 1

Figure 1:
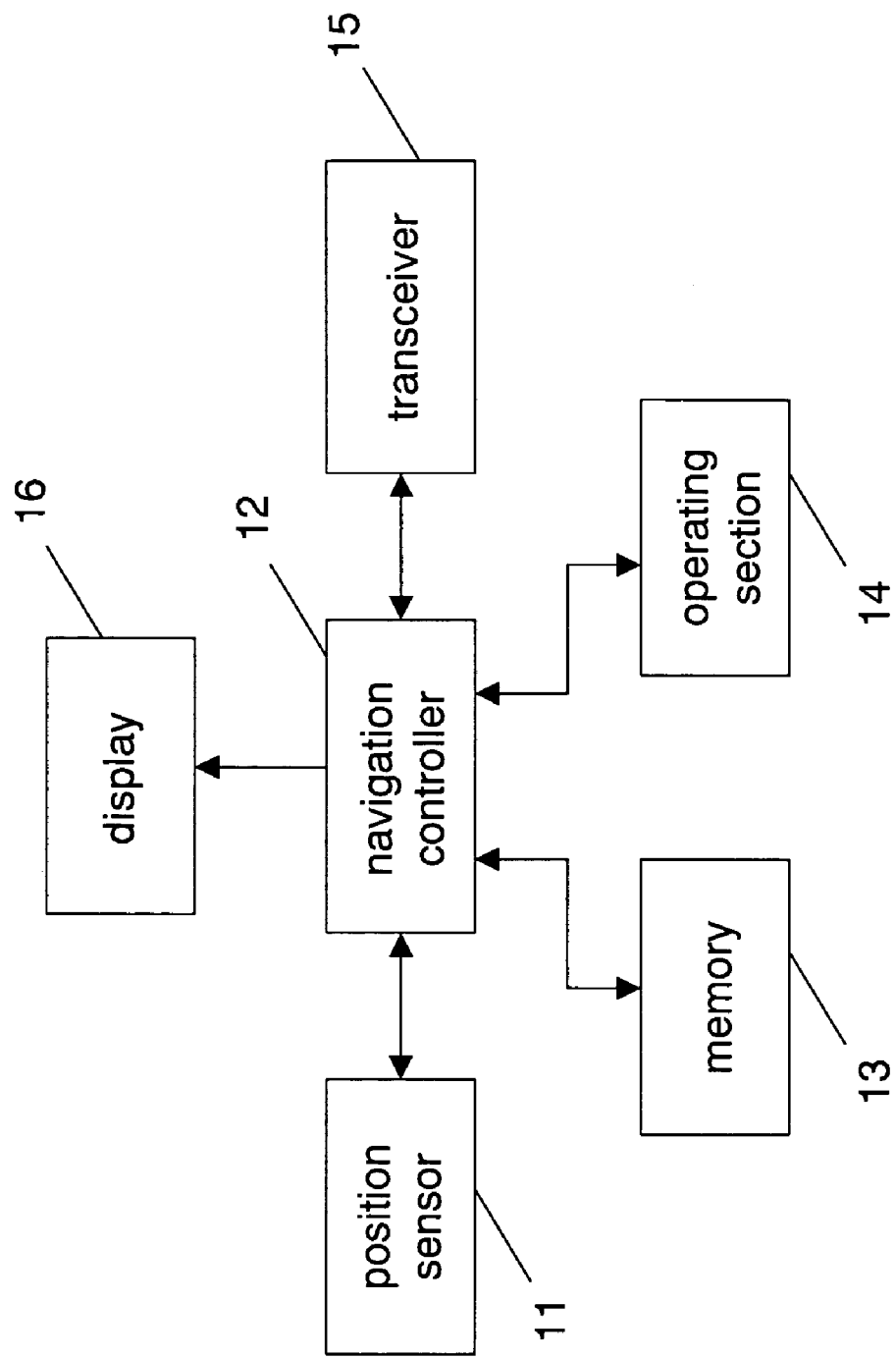
FIG. 1 shows a schematic block diagram illustrating a navigation system in accordance with a first exemplary embodiment of the present invention.

FIG. 1 shows a schematic block diagram illustrating a navigation system in accordance with the first exemplary embodiment of the present invention. In FIG. 1, position sensor 11 includes a GPS receiver and a self-contained navigation measuring device, and senses a present self-position before supplying it to navigation controller 12.

Memory 13 is formed of a CD-ROM or a DVD-ROM for storing map information and candidates for a meeting-place. The map information and the candidates stored in memory 13 are read out when necessary, and supplied to navigation controller 12 following the control of controller 12.

Operating section 14 is used for inputting information such as a destination, transit place, and a variety of instructions. Both of the information and the instructions input through operating section 14 are supplied to navigation controller 12.

Transceiver 15 obtains service information of trains and buses, information of traffic jam on roads (including information of jam caused by railway crossings), information of road works, other traffic related information, and jam information at stations, bus stops, and parking lots registered in advance. The foregoing information can be obtained via radio communication between transceiver 15 and a center device (not shown).

The information obtained by transceiver 15 is supplied to navigation controller 12. Transceiver 15 can communicate with other navigation devices via a direct radio communication or the public radio communications.

Navigation controller 12 reads the map information around the present location sensed by position sensor 11 from memory 13, and displays the map of the present location and its vicinity on display 16. If a destination or a transit place is input through operating section 14, controller 12 also sets automatically the routes to the transit place and the destination before displaying them on display 16.

When a given instruction is input through operating section 14, navigation controller 12 controls transceiver 15 based on the instruction. Controller 12 obtains service information of trains and buses, information of traffic jam on roads, information of road works, other traffic related information, and jam information at the spots registered in advance such as parking lots. The foregoing information can be obtained via radio communication between transceiver 15 and a center device (not shown).

Navigation controller 12 obtains positional information of the other navigation devices, namely, the positional information of the other parties, via radio communications between transceiver 15 and the other navigation devices. Based on the positional information of the other parties and the service information as well as the jam information previously obtained, navigation controller 12 extracts plural candidates for a place, e.g. several places, suitable for itself and the others to meet each other from a large number of adequate meeting places registered in advance in memory 13. Then controller 12 displays them as the plural candidates for a meeting place on display 16.

One place is selected from the plural candidates shown on display 16 through operating section 14 for determining the one as the meeting place. Navigation controller 12 transmits the following information to the other parties: the meeting place determined, the map information and route guidance to the meeting place, and the meeting time and an expected arrival time at the meeting place.

An operation of the navigation system discussed above is demonstrated hereinafter with reference to FIG. 2 and FIG. 5.

Figure 2:
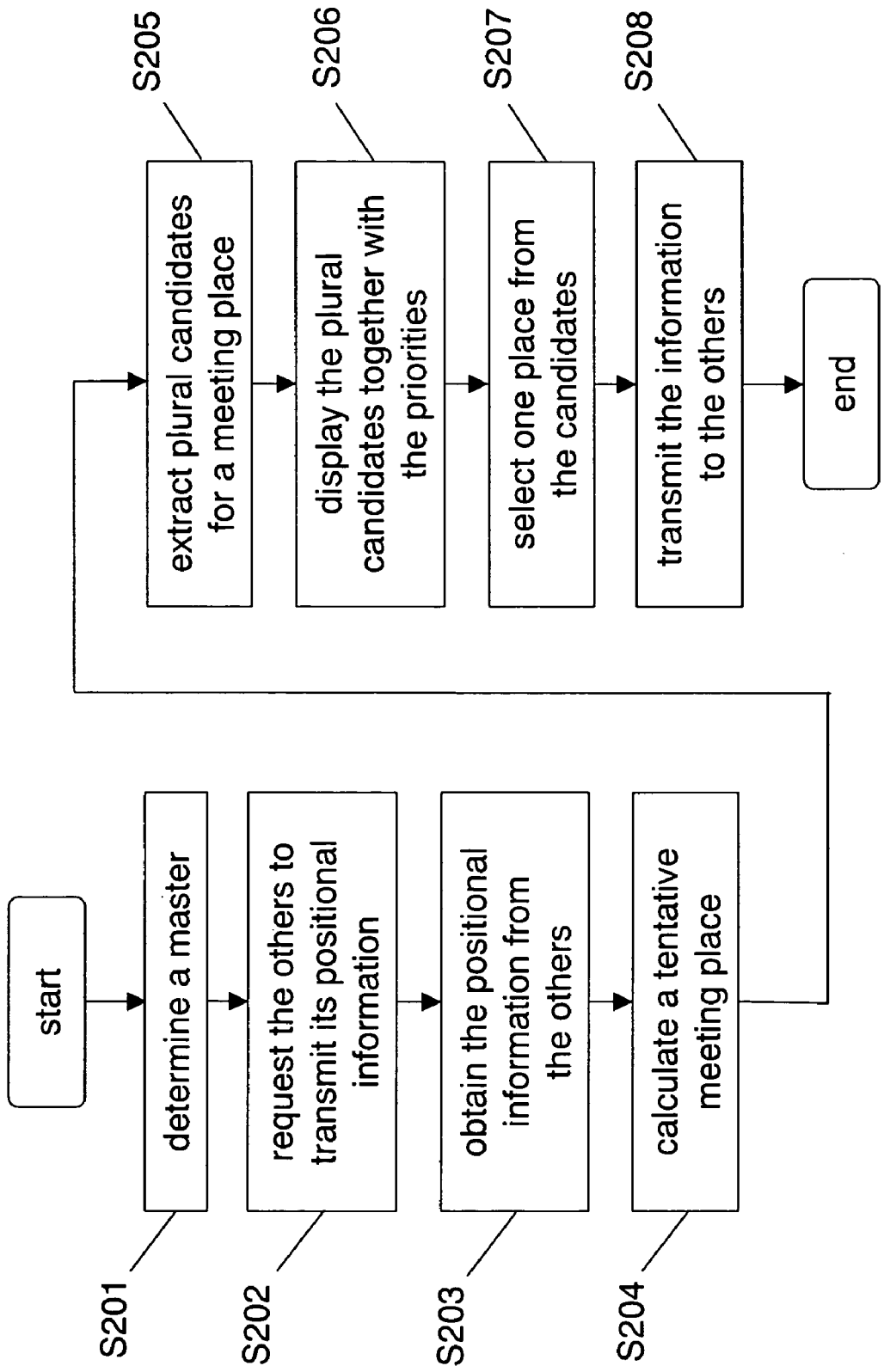
FIG. 2 shows a flowchart illustrating an operation of the navigation system shown in FIG. 1.

FIG. 2 shows a flowchart illustrating an operation of the navigation system in accordance with the first embodiment. FIG. 5 shows a schematic drawing illustrating more specifically the operation in accordance with the first embodiment.

When some one wants to meet others, the one specifies desirable others to meet by a key-operation using the one's own navigation device. Navigation controller 12 detects the key-operation, then instructs transceiver 15 to start radio-communication between the desirable others and the one itself. Based on this radio-communication, navigation controller 12 assigns some navigation device to be a master navigation device and the others to be slave navigation devices.

The master device and the slave devices can be determined through communications between the master device and the slave devices; however, any one of the devices can be assigned to be a master and the others can be assigned to be slaves. For instance, a navigation device of a calling party, a navigation device installed in a car, or a navigation device of which navigation controller 12 has a higher processing capacity can be automatically the master device. On the other hand, navigation devices of called parties, portable navigation devices, or navigation devices of which navigation controller 12 is a lower processing capacity can be automatically slave navigation devices.

The assignment of the master navigation device prompts the master device to communicate with the slave devices and the center device, and operates as shown in FIG. 2.

For making the descriptions simpler, the master navigation device is referred to simply as "itself" and the slave navigation devices are referred to simply as "others" hereinafter.

First, a navigation device is determined to be a master (S201), then the master navigation device requests other navigation devices, which are assigned to be slave devices, to transmit respective present locations to itself (S202).

When other navigation devices transmit their present locations to itself in response to the request, itself receives information of the others locations (S203) and supplies the information to navigation controller 12.

Controller 12 calculates a tentative meeting place (S204) in a minimum time based on the information of other's locations and the present location of itself. Then controller 12 extracts plural candidates, e.g. several candidates for a meeting place, in the vicinity of the tentative meeting place from a large number of adequate meeting places stored in memory 13 in advance (S205).

In other words, a large number of places suitable for meeting places such as a station, bus stop, supermarket, convenience store, park, public office, community center, school, shopping mall, cinema complex, and open space, are stored in memory 13.

Navigation controller 12 extracts plural candidates, e.g. several candidates for a meeting place, from the large number of adequate meeting places stored in memory 13.

Priorities are assigned to adequate meeting places stored in memory 13 from the viewpoint of suitable for persons and cars to meet each other. Navigation controller 12 extracts the plural candidates from memory 13 (S205), then reads the priorities from memory 13, and displays them together with the candidates on display 16 (S206).

Use of the displayed priorities allows the user to select one meeting place out of the plural candidates extracted, so that the user selects the one from the candidates through operating section 14 based on the priorities displayed (S207) for determining the one as the meeting place.

Determination of the meeting place prompts controller 12 to set the route to the meeting place and display it on display 16. Controller 12 also transmits the selected meeting place and the route to the meeting place to the others via transceiver 15 (S208).

The others and itself thus follow the route guidance transmitted or the route guidance to the meeting place determined, and move toward the meeting place, then they can meet each other efficiently at the meeting place. The meeting place in this case is selected from a number of candidates suitable for persons and cars to meet, so that the place should not be an inconvenient place for the meeting. As a result, the navigation system advantageously causes little trouble to the related persons and cars.

In this embodiment, when one place is selected from plural candidates extracted (S207), a selection is done manually using operating section 14; however, the one place can be selected automatically by controller 12 based on the respective priorities. In this case, the following structure can also produce a similar advantage to what is discussed above: Step 206 of displaying the plural candidates together with the priorities can be omitted, and in step 207, only one meeting place having the highest priority is selected without displaying the plural candidates. In step 208, the selected meeting place is displayed together with the route guidance on display 16.

Next, a specific instance of the priorities of meeting places for persons and cars to meet is described hereinafter.

The adequate meeting places for persons and cars are registered in advance, they are a station, bus stop, supermarket, convenience store, park, public office, community center, school, shopping mall, cinema complex, and open space. In the case of assigning priorities to those places, first of all, availability of a place for parking cars is considered, then the following conditions are set: if the parking place is available, cars should arrive earlier than persons, and if not, persons should arrive earlier than cars. The priorities are then determined.

If the parking place is available, and yet, in the case of a pay parking lot, it is not preferable to wait for a long time at the parking lot, so that the priority of the meeting place is lowered if the fee is expensive, and the priority is raised if the fee is inexpensive.

Further, if the meeting place is near to the tentative meeting place, the priority is raised, and if it is distant, the priority is lowered. If the person to meet is expected to use a train or a bus, the fare of the train or bus and a time on foot are taken into account, and the priority is raised as the fare becomes less expensive and a time on foot becomes shorter. As such, the priorities are assigned to respective candidates for a meeting place.

In the case of meeting cars each other, it is not critical which car arrives earlier, so that a candidate with a parking lot gets a higher priority, and yet, if it is a free parking lot, the candidate gets still higher priority.

Next, the case where car 101 meets person 102 is described with reference to FIG. 5. In this case, since person 102 is near the station and the bus stop, it is expected that person 102 takes a train or a bus to meet car 101. When taking the train or bus, person 102 needs the time-table and the table of fare of the trains or bus. Thus transceiver 15 firstly obtains those materials from the center device (not shown). Car 101 needs the information about traffic jam and road works, so that transceiver 15 obtains the information from the center device.

Based on the foregoing information about the train, bus, and roads, navigation controller 12 calculates the place where car 101 and person 102 can meet fastest, and determines the place as a tentative meeting place.

Assume that the present time is 13:00, a meeting place for car 101 and person 102 to meet fastest is calculated in the following three cases:

(1) person 102 moves to station 301 by train;
(2) person 102 moves to station 302 by train; and
(3) person 102 walks along road 204.

The calculations produce the following results:

(1) person 102 moves to station 301 by train;
Person 102 takes a train from station 303 and arrives at station 301 at 13:30, then walks along road 201. Car 101 drives on road 201 and encounters traffic jam. As a result, car 101 and person 102 can meet at position 901 at 13:48.

(2) person 102 moves to station 302 by train;
Person 102 takes a train from station 303 and arrives at station 302 at 13:20, then walks along road 205. Car 101 takes road 204 then road 205, and encounters road works on road 205. As a result, car 101 and person 102 can meet at position 902 at 13:35.

(3) person 102 walks along road 204 and car 101 drives on road 204:
Road 204 has no traffic jam, so that car 101 and person 102 can meet at position 903 at 13:20.

Among the foregoing three cases, position 903 allows car 101 and person 102 to meet each other fastest, so that navigation controller 102 calculates position 903 as a tentative meeting place (S204).

In step 204, the tentative meeting place is calculated based on a condition that they can meet each other fastest; however, the present invention is not limited to this condition. Besides the time needed for meeting, a fare of train, bus, or taxi, and a toll of highway are taken into account for calculating a tentative meeting place if the two parties use such transportation. A walking speed of person 102 can be registered in advance, or the speed can be set individually.

After the calculation of the tentative meeting place (S204) as discussed above, plural candidates for the meeting place are extracted from the adequate meeting places registered in advance (S205). Assume that the tentative meeting place is position 903, then convenience store 601 and parking lot 503 are extracted for example. Priorities are assigned to convenience store 601 and parking lot 503 based on the conditions proper to those places, and expected arrival times at those places. The conditions proper to those places include, e.g. availability of a parking lot, fee of the parking lot, and spaces available in the parking lot. The conditions proper to person 102 includes, e.g. whether or not it takes over 30 minutes (registered as a limit time on foot) on foot.

The priorities are calculated based on the conditions proper to the candidates and expected arrival times at the respective candidates, then assigned to the candidates.

Assume that convenience store 601 and parking lot 503 have the following conditions and expected arrival times:
(1) convenience store 601: parking lot: available and free of charge
  expected arrival time of car 101: 13:22
  expected arrival time of person 102: 13:15
(2) paring lot 503: parking lot: available with fee 200 yen every 30 minutes
  expected arrival time of car 101: 13:25
  expected arrival time of person 102: 13:10

In the foregoing instance, convenience store 601 and parking lot 503 have parking lots. Thus if car 101 arrives earlier than person 102, car 101 can wait in the parking lot, so that person 102 does not necessarily arrive earlier than car 101. Based on this situation, the expected arrival times and the fee of the parking lot, the priorities are determined as follows:

In the case of meeting at convenience store 601, person 102 walks longer time than meeting at parking lot 503; however the time on foot (15 minutes) does not exceed the limit (e.g. 30 minutes but changeable by setting) for a human being to walk. Therefore, a higher priority is assigned to convenience store 601 than parking lot 503 because of the free parking lot and the earlier meeting time. Then convenience store 601 is selected (S207).

If the candidates for the meeting place include no parking lot, car 101 can temporarily stop at the roadside in order to pick up person 102; however, car 101 must leave the roadside as soon as possible. In this case, person 102 is required to arrive at this meeting place earlier than car 101. Thus a candidate, where person 102 might arrive later than car 101, gets a lower priority than other candidates. Because if car 101 arrives earlier than person 102, car 101 possibly gets a ticket due to parking violation, this possible situation is taken into account for determining the priorities.

In the case of selecting one place according to the priorities, the selection can be done automatically; however, it can be manually done using the following method: Display the candidates, conditions proper to the candidates, and expected arrival times of car and person on display 16, then select one place manually.

After the selection of convenience store 601, the map information and route guidance to convenience store 601 together with the name of convenience store 601 are transmitted to the other party (S208). Following the map information and route guidance, car 101 and person 102 move to convenience store 601, then person 102 arrives there at approx. 13:15, and car 101 arrives at approx. 13:22. As a result, car 101 and person 102 can meet each other at convenience store 601 at 13:22.

Next, the case, where car 101, person 102 and person 103 meet each other, is described hereinafter with reference to FIG. 5. In this case a tentative meeting place for car 101, person 102 and person 103 is calculated in step 204. Since persons 102 and 103 can take a train and a bus respectively, transceiver 105 obtains the service and fare information of the train and the bus from the center device. Based on the information from the center device and the information about traffic jam, road works and other traffic related information obtained by transceiver 15, navigation controller 12 calculates a tentative meeting place for car 101, person 102 and person 103.

Assume that the tentative meeting place is figured out as a place near station 301, then plural candidates registered in advance and located in the vicinity of the tentative meeting place are extracted (S205), i.e. they are station 301, convenience store 602, parking lots 501 and 502.

Priorities are assigned to those candidates extracted. The following factors are taken into account for determining the priorities; conditions proper to the candidates (availability of a parking lot, charge or free and fee of the parking lot), expected arrival time of car 101, person 102 and person 103.

Those priorities are displayed together with the plural candidates on display 16 (S206), and one place with a higher priority is selected (S207). For instance, under the condition that the tentative meeting place is close to station 301, if persons 102 and 103 can arrive at station 310 a little bit earlier than car 101, station 301 having the highest priority is selected as the meeting place, then the map information and route guidance to the selected meeting place are transmitted together with the name of the meeting place to other parties (S208).

Car 101, person 102 and person 103 move to the selected meeting place following the map information and route guidance, so that they can meet each other at the meeting place with ease.

As discussed above, according to the first embodiment of the present invention, a tentative meeting place is firstly calculated based on a present location of itself and those of the others. Then plural candidates, located in the vicinity of the tentative meeting place and registered in advance, for a meeting place are extracted. Finally one place is selected as the meeting place based on the priorities assigned to the candidates.

The foregoing mechanism allows selecting a final one from adequate meeting places registered in advance, so that the final one cannot be an inadequate place for meeting but can be always a favorable place for meeting.

The candidates for the meeting place are assigned with priorities which are determined in the following manner: a case where a person and a car meet each is taken into account, and if a parking lot is available, the car can arrive earlier than the person. If a parking lot is not available, the person must arrive earlier than the car. Thus it is advantageous that no parking violation or no trouble to the car and the person occurs.

EXEMPLARY EMBODIMENT 2

Figure 3:
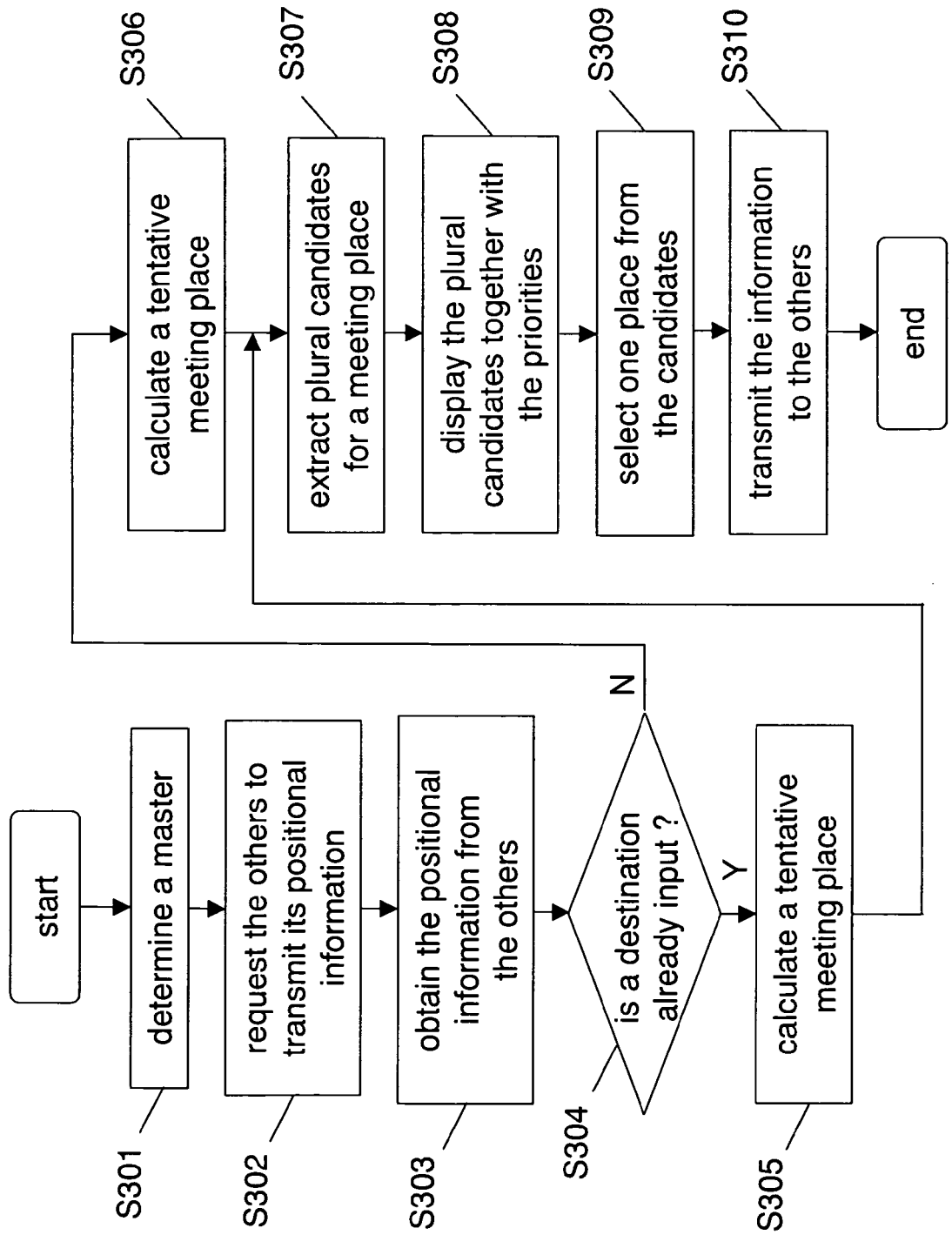
FIG. 3 shows a flowchart illustrating an operation of a navigation system in accordance with a second exemplary embodiment of the present invention.

The second embodiment is demonstrated with reference to FIG. 3, which shows a flowchart illustrating an operation of the navigation system in accordance with the second embodiment.

The second embodiment differs from the first one in the following point: An input of a destination or a transit place on the way to the destination through operating section 14 allows displaying the map information and route guidance to the destination or the transit place on display 16. The meeting place fastest to arrive is calculated taking into account the destination or the transit place.

In FIG. 3, step 301–step 303 are similar to step 201–step 203 shown in FIG. 2. Navigation controller 12 obtains present locations of the other parties that want to meet each other (S303). Then controller 12 checks whether or not the destination (hereinafter including the transit place) is already input (S304). If the destination is not yet input, a fastest reachable meeting place is calculated based on its own positional information and those of the other parties as done in the first embodiment (S306). If the destination is already input, a fastest reachable meeting place is calculated based on the destination, its own positional information and those of the other parties (S305).

After the calculation of the fastest reachable meeting place (S305, S306), plural candidates for a meeting place are extracted from adequate meeting places registered in advance (S307). The candidates are located in the vicinity of the fastest reachable meeting place. Then the plural candidates are displayed together with their priorities on display 16 as done in the first embodiment (S308). One place is selected manually or automatically as the meeting place (S309), then the map information and route guidance to the meeting place are transmitted together with the name of the meeting place to the other party (S310).

As discussed above, in this second embodiment, in the case of inputting a destination, the fastest reachable meeting place is extracted, so that the most appropriate meeting place can be always selected when the parties are on the way to the destination.

Next, a case where a destination is already input is detailed with reference to FIG. 5. Assume that person 102 meets car 101 for driving to a destination. In the first embodiment, car 101 and person 102 simply want to meet each other as fast as possible, so that position 903 is calculated as a tentative fastest reachable meeting place based on the positional information of both the parties. However, in the second embodiment, an input of the destination is sensed by navigation controller 12 (S304), and controller 12 calculates a tentative meeting place taking the destination into consideration (S305).

To be more specific, in the case of the second embodiment, when a destination is input at the navigation device of car 101, a route guidance is produced such as "take road 201 via station 301 to intersection 403, then turn to left at intersection 403 and take road 203 toward the destination". A tentative meeting place for car 101 and person 102 are calculated based on the foregoing route guidance. In this instance, even if it takes, more or less, a time to arrive at the meeting place, they can eventually arrive at the destination earlier than the case when they meet at station 303. Therefore, e.g. a place near station 301 is extracted as the tentative meeting place.

In the case of meeting persons 102, 103 and car 101 each other before driving to a destination, a similar manner to what discussed above is taken, for instance, a place in the vicinity of station 301 is calculated as a tentative meeting place considering the route guidance of car 101.

After that, in a similar manner to the first embodiment, plural candidates for a meeting place are extracted (S307), and displayed on display 16 (S308). One place is selected from the displayed candidates (S309), then the map information, route guidance to the meeting place are transmitted together with the name of the meeting place to each one of the other parties (S310). The other parties and itself move to the selected meeting place following the map information and route guidance, thus they can meet each other at the selected meeting place with ease.

EXEMPLARY EMBODIMENT 3

Figure 4:
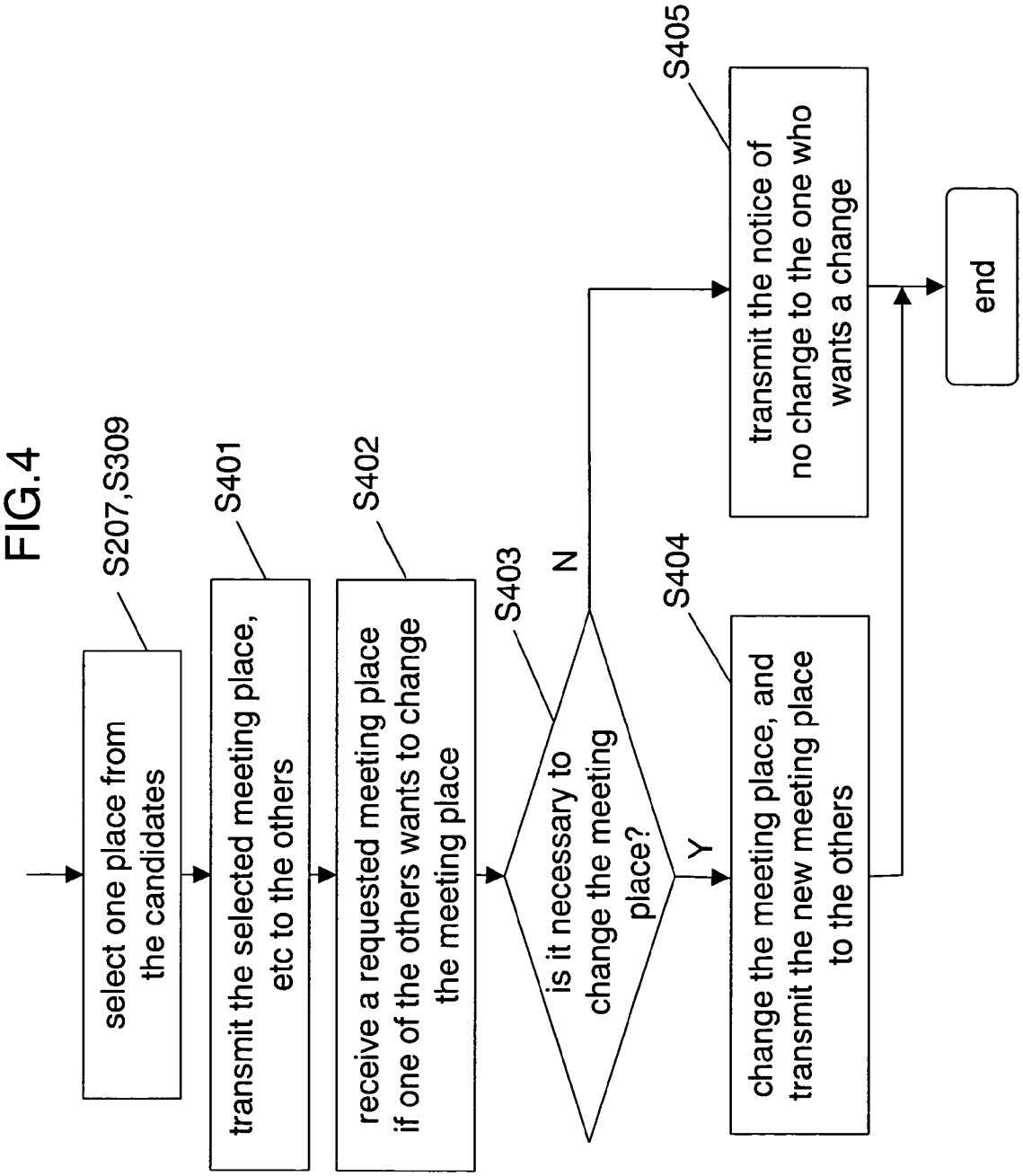
FIG. 4 shows a flowchart illustrating an operation of a navigation system in accordance with a third exemplary embodiment of the present invention.

The third exemplary embodiment is demonstrated hereinafter with reference to FIG. 4, which shows a flowchart illustrating an operation of the navigation system in accordance with the third embodiment of the present invention.

The third embodiment differs from the first and the second ones in adding steps 401–405 after step 207 and step 309 of the first and the second embodiments.

To be more specific, after the selection of one place from the plural candidates (S207, S309), the map information and route guidance are transmitted together with the name of the selected one to each one of the other parties (S401). If the selected one is unfavorable for one of the other parties, the one of the other parties transmits a desirable meeting place to the master itself (S402).

Based on a new meeting place transmitted from one of the other parties, the master itself determines whether or not it is necessary to change the meeting place (S403), and inputs the determination through operating section 14. If the change is necessary, itself changes the meeting place, and transmits the map information and route guidance to the changed meeting place together with the name of the changed meeting place to all the other parties (S404).

If the change is not needed, itself transmits a message of no change only to the one who proposed the new meeting place (S405).

Figure 5:
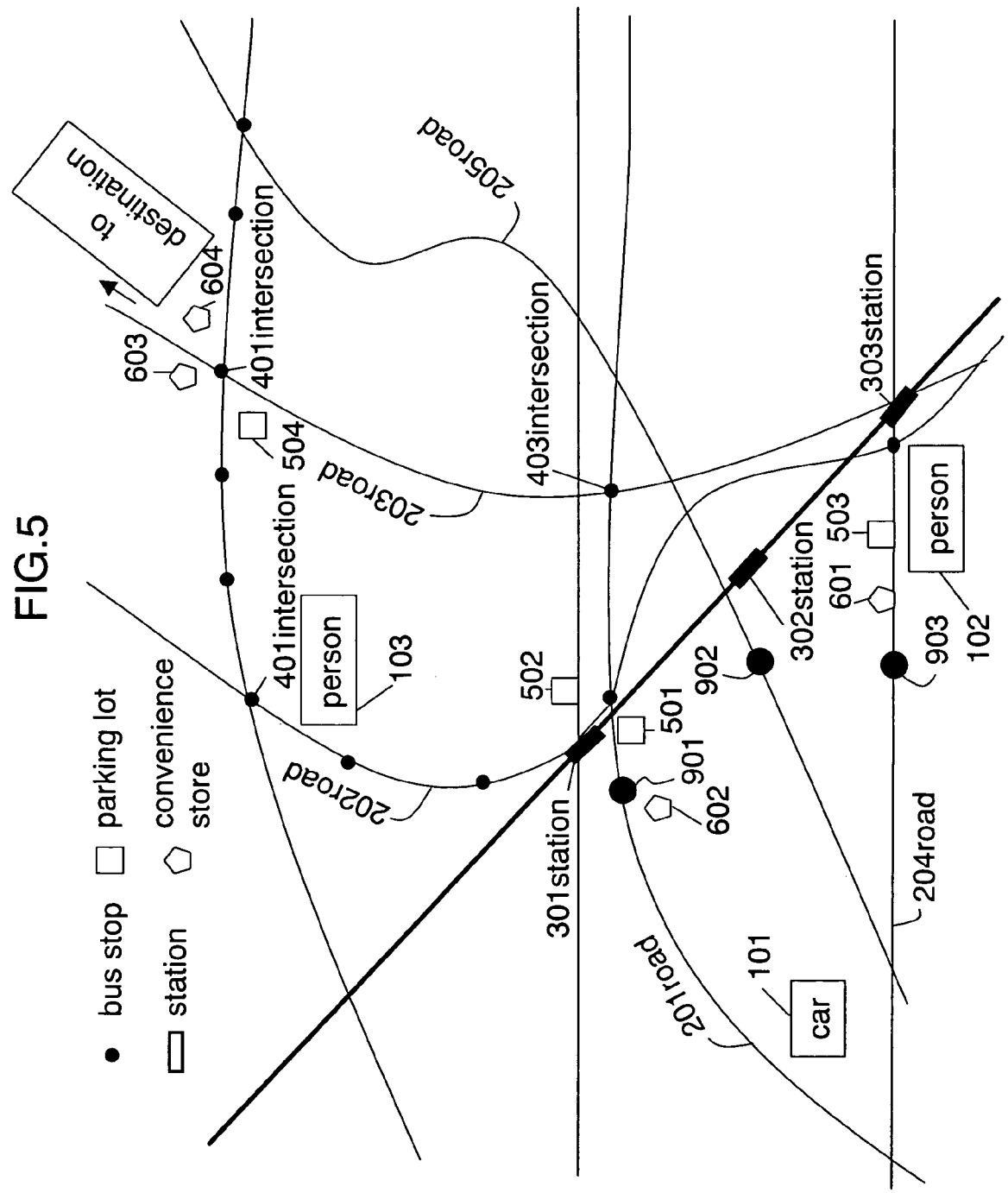
FIG. 5 shows a schematic drawing illustrating more specifically the operations of the navigation systems in accordance with the first, second and third embodiments of the present invention.

Here is a description about a specific instance with reference to FIG. 5. In FIG. 5, assume that persons 102, 103 and car 101 want to meet each other before travelling to a destination. In this case, station 301 is selected as a meeting place (S309), and this information is transmitted to persons 102 and 103 (S401).

Person 102 has no problem about the meeting place (station 301) selected; however, it is possible that person 103 has problem about this place. For instance, person 103 wants car 101 to take road 202 from station 301, and take road 203 via intersections 401 and 402 instead of driving via intersection 403. In another case, person 103 possibly wants to take a bus and travel via intersection 401 toward intersection 402, and wants to meet the other parties at a place near intersection 402, but person 103 admits the driving route of car 101 to stay as it is.

In such a case, person 103 selects the nearest bus stop as a desirable meeting place and transmits it to the master navigation device if car 101 takes road 202 from station 301, then passes intersections 401 and 402, then takes road 203. If person 103 wants to take bus and travel via intersection 401 toward intersection 402, and wants to meet the other parties at a place near intersection 402, person 103 specifies one of convenient stores 603, 604, or parking lot 504, then transmits the specified one to the master (S402).

The master navigation device receives the information transmitted by person 103, then determines whether or not it is necessary to change the meeting place (S403). If the change is necessary, the master changes the meeting place, and transmits the map information and route guidance to the changed meeting place together with the name of the changed meeting place to not only person 103 who wants the change but also person 102 (S404).

If the change is not needed, the master transmits a message of no change only to person 103 (S405).

In the third embodiment, if the meeting place selected manually or automatically by the master is unfavorable for one of the slaves, the one slave transmits its desirable meeting place to the master, and a change of the meeting place depends on the master's choice. If the meeting place is changed, the change is noticed to all the slaves, so that the master and the slaves can meet each other efficiently.

In the first, second and third embodiments, when a meeting place is determined, a given operation through operating section 14 carries out a sequence of actions. Thus if the meeting place is confirmed repeatedly within the same parties, the same operation must be repeated every time. However, if the operation is once done, the operation can be repeated by returning automatically to step 202 or step 302 until the parties meet each other. For instance, the operation is repeated at intervals of 5 minutes, 10 minutes, or 15 minutes, or the intervals are shortened step by step such as, at a first interval in 10 minutes, second interval in 5 minutes and third interval in 2 minutes.

In the case of using the foregoing mechanism, as they are approaching the meeting place, they can confirm their instant positions, thereby changing the meeting place manually or automatically in response to the situation. As a result, they can determine an appropriate meeting place more quickly, so that they can meet each other at the meeting place more positively.

In embodiments 1–3, information obtained from the center device includes time tables and fares of bus and train, other services, traffic jam, road works, other traffic news, and spaces available in a parking lot. However, all the time-dependent information necessary for cars and persons to meet each other can be obtained from the center device which manages or holds the foregoing information.

In embodiments 1–3, all the steps are executed by the master navigation device, such as, determination of the master and the slaves (S201, S301), transmission of the map information and route guidance to a selected meeting place together with the name of the selected meeting place to other parties (S208, S310). If the selected meeting place is changed, the master device also execute the transmission of the information about the changed one to other parties (S404), if it is not changed, transmission of a message of no change (S405). However, parts of those steps or all of those steps can be shared with the center device or the slave navigation devices.

In short, the present invention is not limited to a stand-alone navigation device installed in a vehicle or hand-carried, but comprises the system including a center device and navigation devices.

For instance, as shown in FIG. 6, navigation devices 61, 62, 63 installed in a vehicle or hand-carried incorporate a memory of small capacity, and each of the devices is what is called a stand-alone navigation device. When those devices want to set a meeting place, a partner to be met is designated, and the positional information of the partner and itself is transmitted to center device 60, which then executes the sequence of the foregoing actions, and transmits the name of the meeting place and the route guidance to the meeting place to navigation devices 61, 62 and 63 that want to meet each other. The foregoing structure also produces the same advantage as what is discussed previously.

In this case, center device 60 can perform as follows before the meeting place is determined: Center device 60 firstly transmits plural candidates for a meeting place, conditions proper to the candidates, and expected arrival times to the navigation device (e.g. device 61) that wants to determine a meeting place. Navigation device 61 selects one place from the candidates, and transmits the selected one to center device 60, which then transmits the route guidance and the name of the selected meeting place based on the selected one to the other navigation devices, e.g. devices 62, 63.

Center device 60 can only extract the plural candidates, the conditions proper to the candidates, and expected arrival times, and other procedures can be executed by the master navigation device (e.g. device 61) and the slave navigation devices.

In short, as discussed previously, all of or parts of steps 201–208 in embodiment 1, steps 301–310 in embodiment 2, and steps 404–405 in embodiment 3 can be shared by center device 60 or slave navigation devices 61, 62, and 63.

The foregoing structure allows a navigation system formed of navigation devices 61, 62, 63 to obtain map information and route guidance from center device 60 respectively and to be capable of this application. Each of the navigation devices has a memory of small capacity, and is what is called a communicating navigation device. This structure allows center device 60 to provide services for meeting, so that this system can invite people to join the system and provide the members with the service for meeting each other free of charge or on chargeable basis.

INDUSTRIAL APPLICABILITY

The navigation system of the present invention includes positional information obtaining means for obtaining positional information of mobile units; extracting means for extracting candidates for a meeting place from adequate meeting places registered in advance based on the positional information obtained; meeting place determining means for selecting one place as the meeting place from the extracted candidates for the meeting place; and transmitting means for transmitting the meeting place to the mobile units. This structure allows selecting a meeting place from appropriate candidates registered in advance for a meeting place, so that the navigation system is suitable for selecting a place favorable for meeting.

The invention claimed is:

1. A navigation system that configures a navigation device as a master and another navigation device as a slave, the master and the slave connected to each other via a network, said master comprising:
   positional information obtaining means for obtaining positional information of said slave;
   extracting means for extracting candidates for a location from a plurality of registered locations based on the obtained positional information, the plurality of registered locations are each of a plurality of types of locations, the extracted candidates including at least one of the plurality of the types of locations;
   location determining means for selecting the location from the extracted candidates; and
   transmitting means for transmitting the selected location to said slave,
   wherein each one of the registered locations is assigned with a priority, and the location determining means selects the location from the extracted candidates according to the priorities.

2. The navigation system of claim 1, wherein the priority is determined by taking into account an availability of a parking lot and an expected arrival time for each of the extracted candidates.

3. The navigation system of claim 1 further comprising:
   display means for displaying the extracted candidates together with the respective priorities; and
   operating means for manually selecting the meeting place.

* * * * *